United States Patent Office.

EDWARD BRADY, OF PHILADELPHIA, PENNSYLVANIA.

Letters Patent No. 93,406, dated August 10, 1869.

IMPROVEMENT IN THE MANUFACTURE OF IRON.

The Schedule referred to in these Letters Patent and making part of the same.

*To all whom it may concern:*

Be it known that I, EDWARD BRADY, of the city and county of Philadelphia, in the State of Pennsylvania, have invented an Improved Mode of Purifying Iron; and that the following is a sufficiently full and exact description thereof, to enable one skilled in the art to which it appertains to carry it into effect.

This invention is an improvement in the process for which I obtained Letters Patent, on the 13th of April, 1869; and, in its preferred form, consists in the combined use of sulphate of calcia, sulphate of alumina, and sulphate of soda, or sulphate of potassa, which, being crushed, mingled, and roasted, are mixed by any suitable mechanical device with iron or crude iron-ore, which has also been crushed and roasted, so that the iron-ore and the chemicals applied thereto may be assimilated to about equal degrees of temperature and intimately blended; or in some cases the dry sulphates may be introduced into the iron while the latter is in a molten state in the furnace.

The smelting, and a fusion and decomposition of the iron-ore or melted iron and dry sulphates being effected by the usual methods in any ordinary furnace or vessels, the chemical changes and results consequent thereupon separating, evolving, and combining, and depositing the impurities of carbon, phosphorus, silica, sulphur, &c., leave the molten iron pure, or convert it into malleable iron or steel.

The oxygen being disengaged upon a decomposition of the dry sulphates caused by the molten iron, or consequent upon the smelting of the iron-ore, or fusion of the iron, will unite with the carbon, phosphorous, and silicon in the sulphuret, &c., of iron left in the molten iron mass, and will form carbonic-acid gas, phosphorous-acid gas, and silicic acid in a liquid state, the gases passing off or escaping, and the acid and the remaining sulphur having a greater chemical affinity for the bases, potassium, calcium, sodium, or aluminum, &c., than for the iron, will combine and form sulphides and silicates or slag, which become separated from the iron by specific gravity, leaving the hot iron free from the impurities of carbon, phosphorus, silica, sulphur, &c., and the pure iron can be gradually cooled and rolled, or hammered or otherwise, into malleable iron, or it can be converted by suddenly cooling it, by immersion in cold water, &c., into steel.

One pound of sulphate of soda, or its equivalent, and one and a quarter pounds of sulphate of lime, will produce a beneficial effect upon four hundred pounds of molten iron; but I do not desire to limit myself to these or any specific quantities, and with iron-ore, where much impurity exists, much larger quantities of the chemicals will of course be used.

The quantity or proportions of material and ingredients to be used cannot be specified very definitely, because the same depend upon the greater or lesser amount or shares of the impurities contained in the iron or iron-ore, which vary materially, according to its quality, requiring a larger or smaller quantity or proportions of the dry sulphates, to be determined by a practical experience in each instance.

What I claim as my invention, and desire to secure by Letters Patent, is—

Mingling or mixing and manipulating, by common mechanical processes, iron or iron-ore which may be crushed, or any molten iron or metal, with sulphate of potassa, sulphate of calcia, sulphate of soda, and sulphate of alumina, or with any sulphates of the metals of the alkalies, earths, or alkaline earths, pulverized, and both may be dried or roasted, or may have been assimilated to about equal degrees of temperature, and the smelting and a fusion and decomposition of the iron-ore or melted iron and dry sulphates being effected by the usual methods in any ordinary furnace or vessels, the chemical changes and results consequent thereupon separating, evolving, and combining and depositing the impurities of carbon, phosphorus, silica, sulphur, &c., and leaving the molten iron pure, and it may be converted into malleable iron and steel, substantially as above described and set forth.

EDWARD BRADY.

Witnesses:
   H. BRADY,
   M. P. BRADY,
   M. A. BRADY.